No. 607,774. Patented July 19, 1898.
H. SOELLNER.
WINDMILL.
(Application filed May 12, 1897.)
(No Model.) 6 Sheets—Sheet 2.
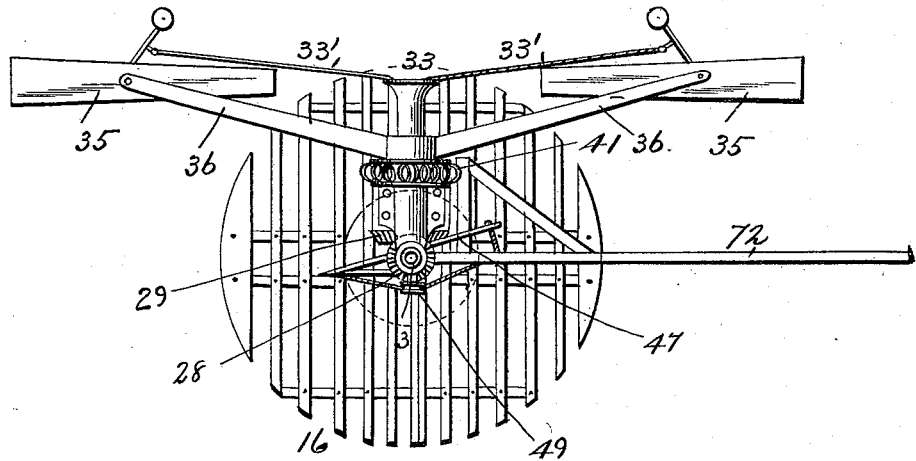
Fig. 2.
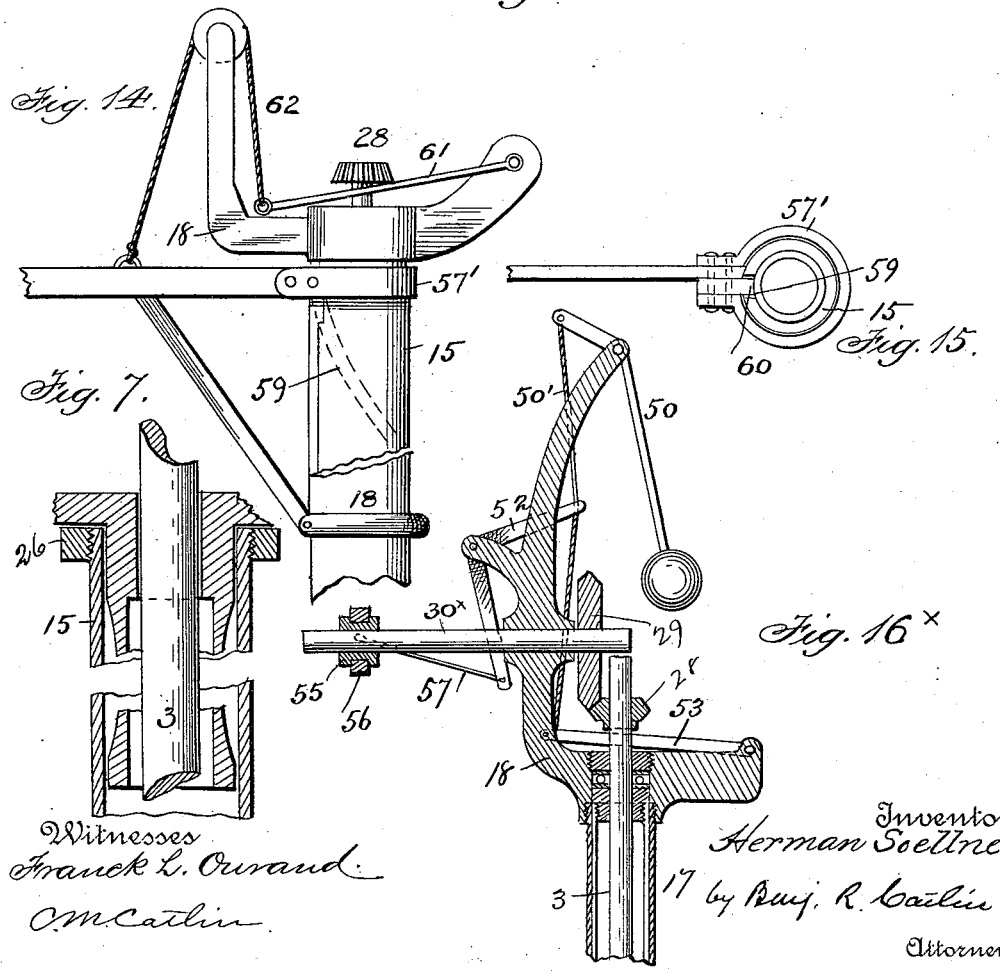
Witnesses
Franck L. Ourand.
C. M. Catlin.
Inventor
Herman Soellner.
by Benj. R. Catlin
Attorney No. 607,774. Patented July 19, 1898.
H. SOELLNER.
WINDMILL.
(Application filed May 12, 1897.)
(No Model.) 6 Sheets—Sheet 4.
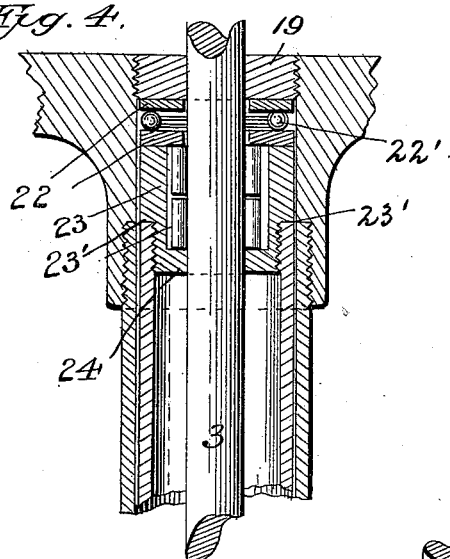
Fig. 4.
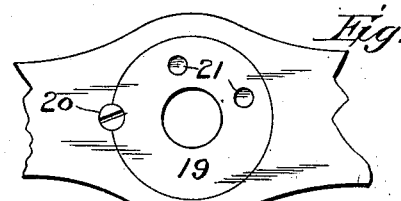
Fig. 5.
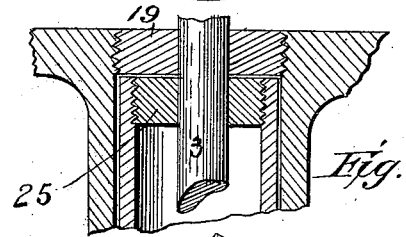
Fig. 6.
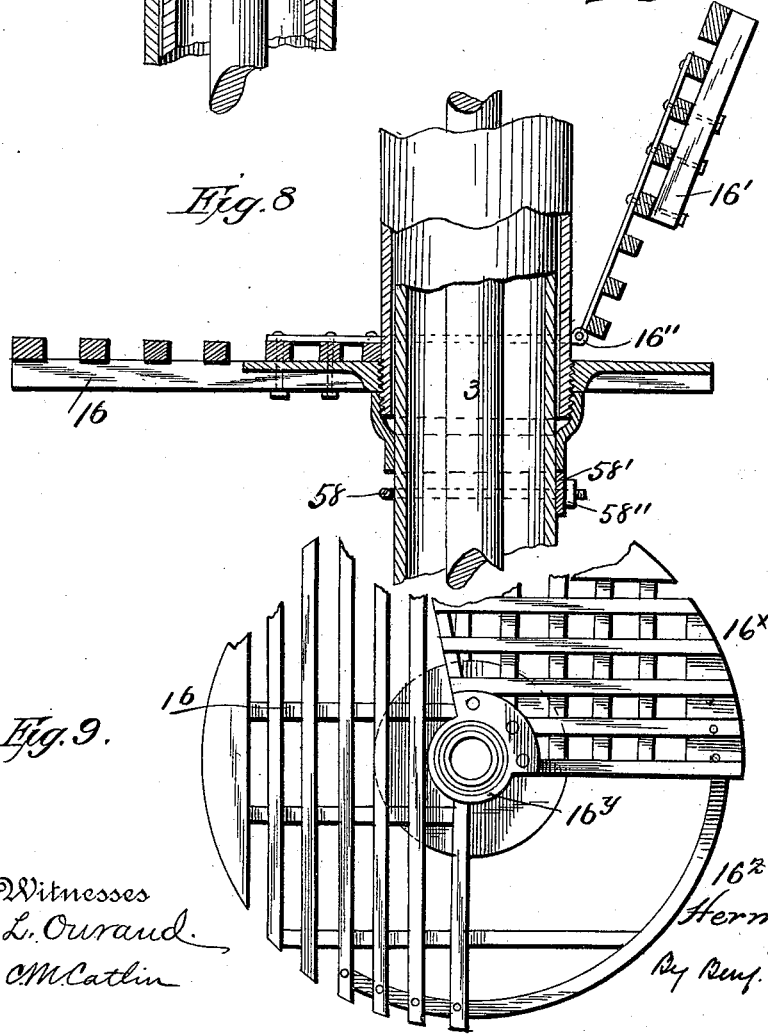
Fig. 8.
Fig. 9.
Witnesses
F. L. Ourand
C. M. Catlin
Inventor
Herman Soellner
By Benj. R. Catlin
Attorney No. 607,774. Patented July 19, 1898.
H. SOELLNER.
WINDMILL.
(Application filed May 12, 1897.)
(No Model.) 6 Sheets—Sheet 5.

Witnesses
F. L. Ourand
C. M. Catlin

Inventor
Herman Soellner
by Benj. R. Catlin
Attorney

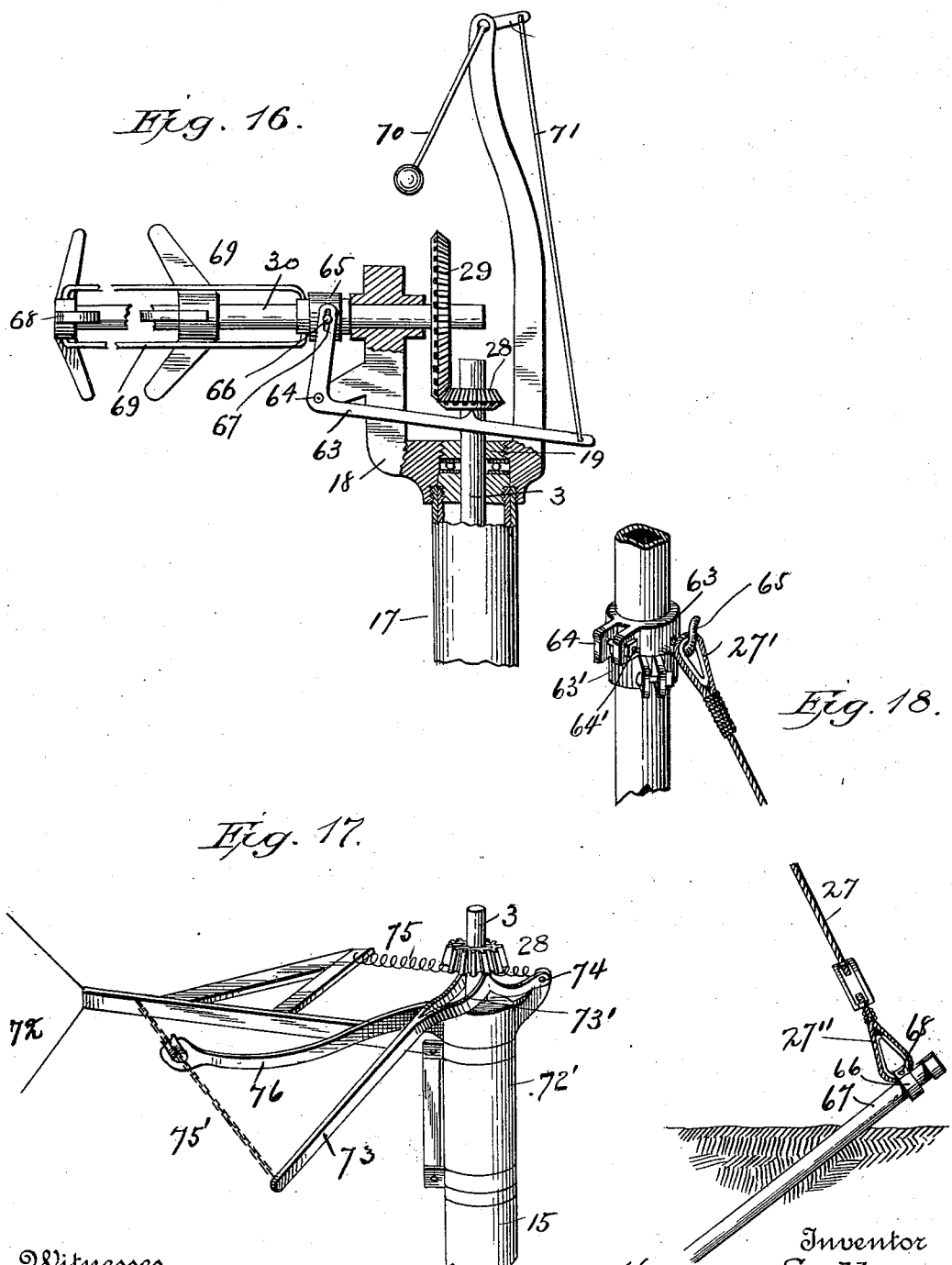

UNITED STATES PATENT OFFICE.

HERMAN SOELLNER, OF ROCHESTER, NEW YORK.

WINDMILL.

SPECIFICATION forming part of Letters Patent No. 607,774, dated July 19, 1898.

Application filed May 12, 1897. Serial No. 636,218. (No model.)

*To all whom it may concern:*

Be it known that I, HERMAN SOELLNER, a resident of Rochester, in the county of Monroe and State of New York, have invented certain new and useful Improvements in Windmills; and I do hereby declare the following to be a full, clear, and exact description of the invention, such as will enable others skilled in the art to which it pertains to make and use the same.

The invention relates to windmills, and has for its object to increase their efficiency and economy; and it consists in the construction hereinafter described and pointed out.

Figure 1:
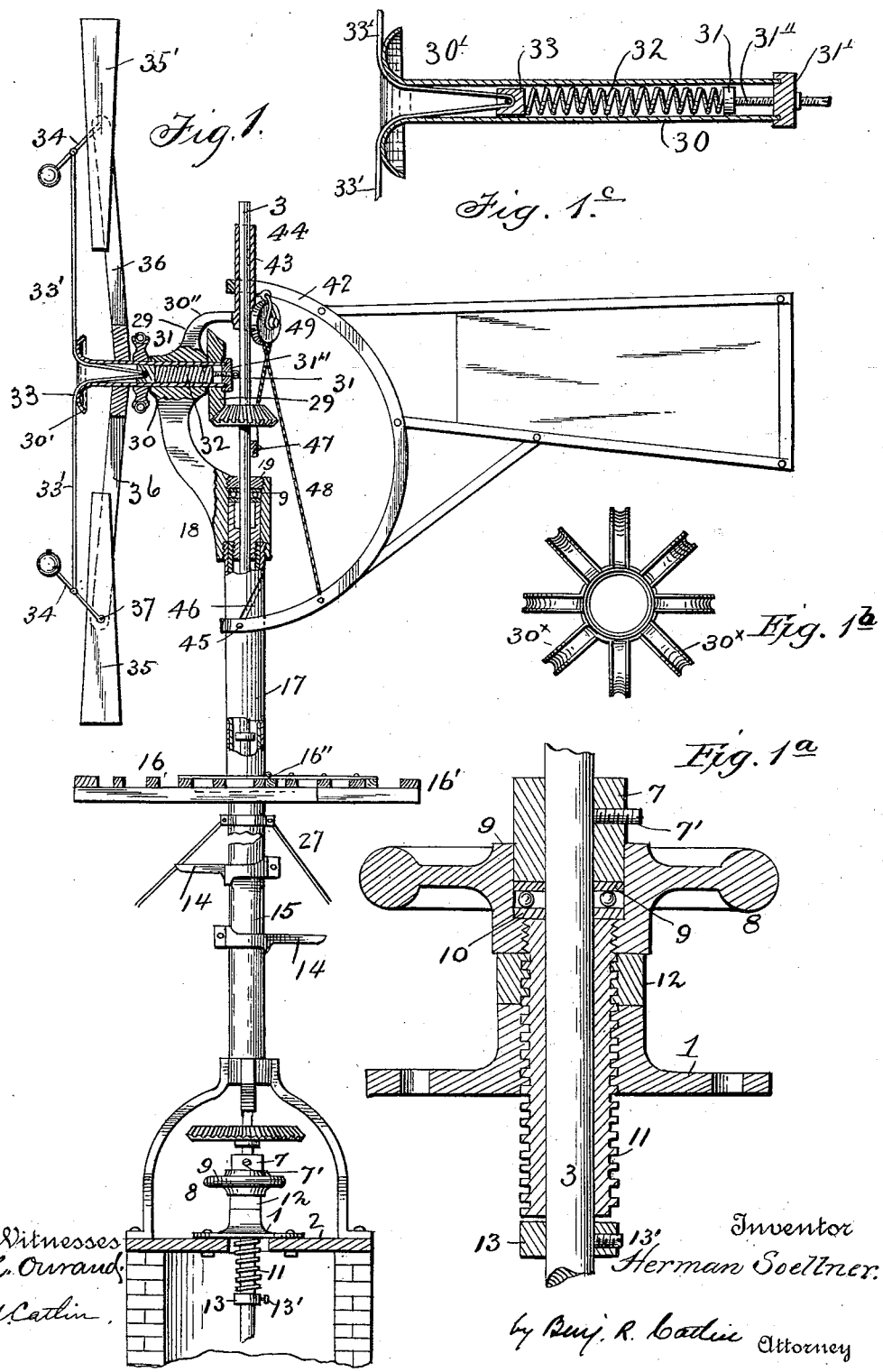
Figure 3:
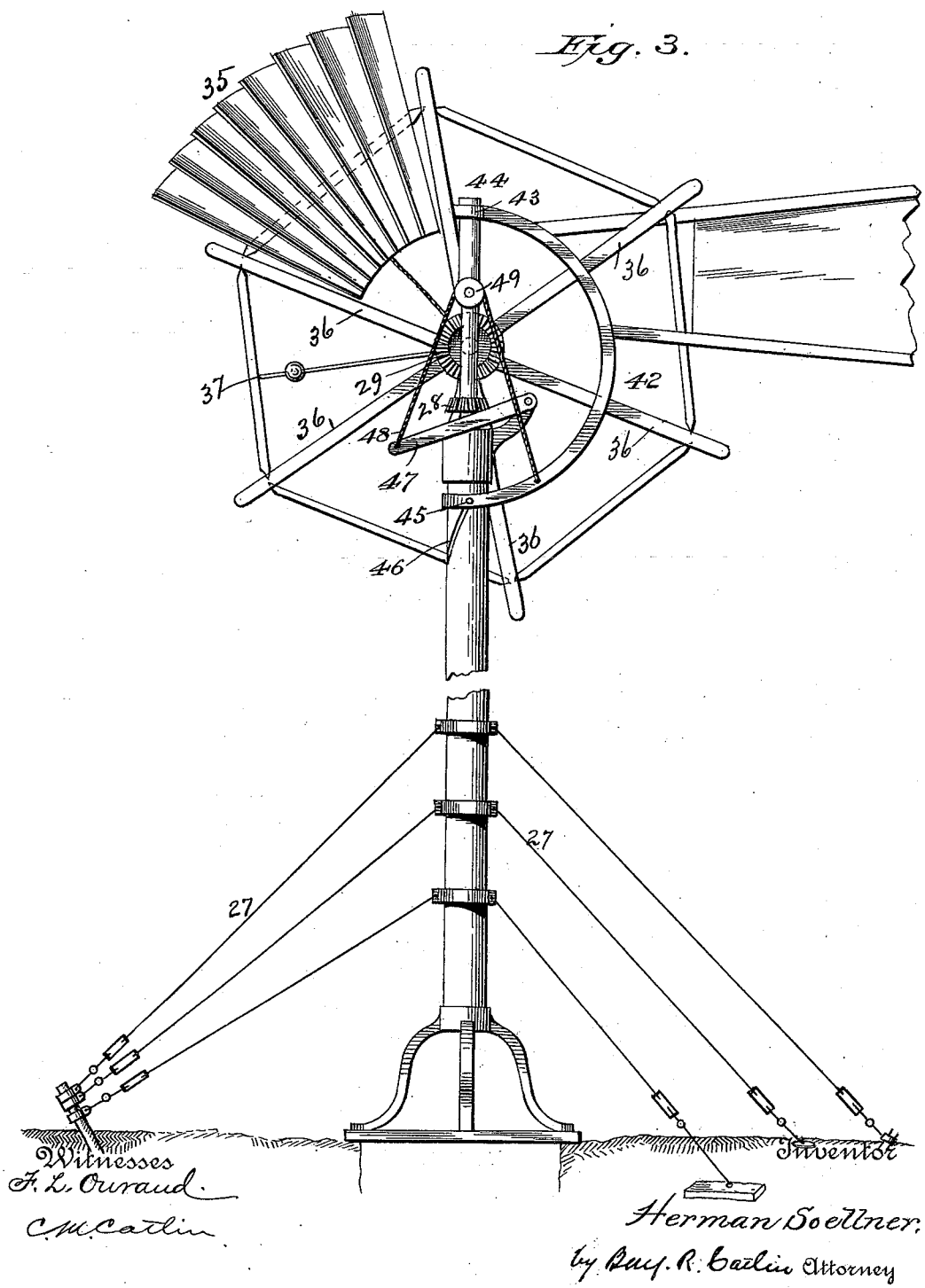
Figure 12:
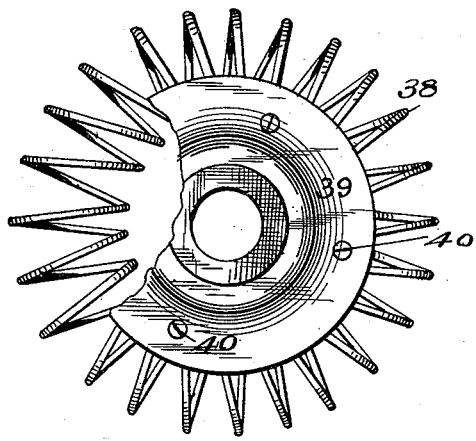
Figure 13:
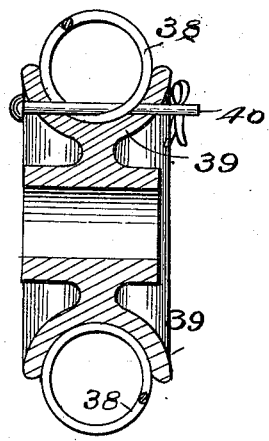
Figure 10:
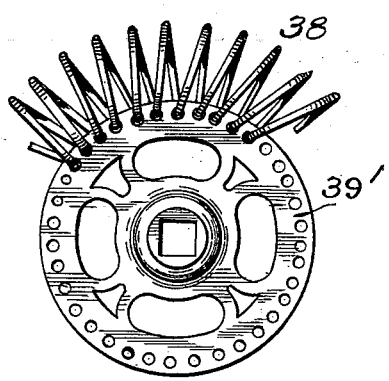
Figure 11:
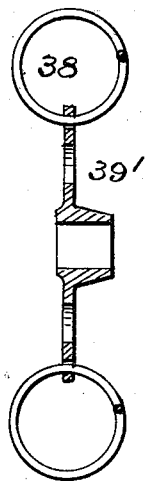

In the accompanying drawings, Figure 1 is a broken elevation of a windmill, partly in section. Fig. 1$^a$ is a vertical central section of the foot of the supporting-pipe and connections. Fig. 1$^b$ is a plan of a modified mouth of the hollow wind-wheel shaft. Fig. 1$^c$ is an enlarged section of the wind-wheel section-regulating device. Fig. 2 is a plan of the wind-wheel, rudder, and platform. Fig. 3 is a broken elevation of the windmill, the wind-wheel being shown at rest. Fig. 4 is a partial vertical central section of the upper end of the windmill-head, supporting-pipe, and connected parts. Fig. 5 is a plan of the same. Fig. 6 is a partial vertical section of a modification of parts connecting the head and supporting-pipe. Fig. 7 is a similar view of another modification of head and supporting-pipe connections. Fig. 8 is a partial vertical section of a tubular guiding extension of the windmill-head supporting a platform. Fig. 9 is a plan of a modification of the platform. Fig. 10 is a plan, partly broken, of a spring-brake device situated on the wind-wheel shaft. Fig. 11 is a vertical section of the same. Fig. 12 is a broken plan of a modification of the spring-brake. Fig. 13 is a central section of the same. Figs. 14 and 15 are respectively a partial side elevation and a partial plan of a wind-wheel rudder. Fig. 16 is a partial section of modified devices for throwing the wind-wheel out of the wind. Fig. 16$^x$ is a similar view of another modification of devices for throwing the wind-wheel out of the wind. Fig. 17 is a partial side elevation of modified devices for moving the rudder. Fig. 18 is a broken elevation of a guy-rope and its immediate connections.

Numeral 1 denotes a tower-base, and 3 denotes a power-transmitting rod supported in any suitable manner, as upon a platform 2. The rod is supported upon the base by the medium of a ring 7, provided with a set-screw 7', which ring has a seat within the hand-wheel 8 and upon a bearing-plate 9. Antifriction-balls are interposed between said plate and a corresponding plate 10, which latter rests upon an exteriorly-screw-threaded sleeve 11, surrounding the rod 3. The sleeve 11 has screw-threaded connection with the base and also with the hand-wheel, as shown in Fig. 2. The sleeve 11 is screwed up or down through the base by suitably manipulating the hand-wheel, and in case the rod 3 does not drop by gravity and follow the sleeve and rest upon the ball-covering plate the screwing down of the sleeve upon the ring 13 will cause the rod to descend.

12 denotes a jam-nut engaging the sleeve and adapted to be screwed down against the base 1.

13 is a ring having a set-screw 13' and adapted, if required, to pull down the rod when the sleeve is forced down upon it by suitably turning down the hand-wheel.

14 indicates steps fixed to the wind-wheel-supporting tube 15, and 16 is a platform fixed to the foot of a guide-tube 17, attached at its upper end to the head or frame 18.

A hinged section of the platform is denoted by 16', and 16'' indicates hinges. (See Figs. 1 and 8.) The platform is preferably made of lattice-work for the sake of lightness and to offer less resistance to the wind. In Fig. 9 is shown a modification of the platform, in which 16$^x$ denotes a quarter-section connected by a ring 16$^y$ to the guide-pipe. This section is movable about the pipe and is supported at its exterior upon a curved bar 16$^z$, attached to the main part of the platform. As shown, the movable section is open and situated above a portion of the fixed part, to which latter the curved bar is attached. The platform being fixed mediately to the rotating head turns horizontally with the horizontal movement of the wind-wheel, and it is more safe and convenient than it could be if fixed to the supporting-pipe 15.

The head or frame 18 and its attached guide-tube 17 rest upon pipe 15 by the medium of a removable screw-plug 19, having screw-thread connection with the head.

20 (see Fig. 5) denotes a screw situated partly in the head and partly in the plug 19 to prevent the latter from unscrewing when not desired.

21 indicates holes for the more convenient manipulation of the plug when it is to be inserted or removed. The plug is made separately removable to avoid the taking down of the head and wind-wheel, as heretofore practiced, to obtain access to the interior of the supporting-pipe.

22 indicates bearing-plates, and 22' intermediate antifriction-balls. The lower plate is seated on the top of a hollow screw-plug 23, screwed into the top of the supporting-pipe and provided with a shoulder or offset 23', seated directly upon the top of the pipe. The bottom of the hollow plug 22 has an annular flange 24, which fits the rod 3, as best seen in Fig. 4.

Heretofore it has been necessary to remove the head and wheel from the supporting-pipe to obtain access to the interior of the upper part of the supporting-pipe for inspection or repairs. This is highly objectionable on account of the weight and size of the wheel, head, and connected parts, and it is to obviate this objection that a plug 19 is removably fixed in the head.

The description immediately foregoing relates to the construction shown in Figs. 1, 4, and 11; but the antifriction-balls 22' may be omitted and the construction otherwise varied. For example, the offset 23' is not essential in all cases, nor the flange 24, and the antifriction-balls may be omitted.

The guide-tube, platform, head, and wind-wheel are temporarily held on the supporting-pipe by a clamp of any suitable character. An approximately U-shaped yoke 58, having its ends joined by a bar 58' and provided with nuts 58" to force the bar against the pipe 15, would operate for the purpose, though other means are not excluded. The object of this construction is to provide for the support of the parts named upon the pipe 15 when the nut or plug 19 is removed to give access to the parts below said plug.

As shown in Fig. 6, the screw-plug 19, fitting the opening in the head, may rest directly upon the top of supporting-pipe 15 and a nut or hollow plug 25 be screwed into the top of said pipe and embrace the rod. This simplifies the construction and will be used in some cases to reduce the cost of the mill.

As represented in Fig. 7, the head or frame 18 rests more directly on the pipe 15, which is reinforced by a ring 26. The head has a tubular extension fitting both the rod 3 and pipe 15 for at least a part of its length and acting as a guide-tube.

The wind-wheel-supporting pipe 15 has at its bottom a tripod or short rigid supporting-feet 15', which uphold it vertically. Preferably these do not enter the ground or foundation, as the feet of windmill-frames customarily do, it being one purpose of the present improvement to avoid the use of heavy and expensive parts in situations specially liable to rust or decay and that cannot be renewed without taking down the mill.

27 denotes guy rods or ropes surrounding the pipe and detachably connected thereto, preferably at various elevations and extending in different vertical planes to stakes, anchors, or other fixed objects below. These may be situated in the earth or foundation and the guys extended outside the windmill platform or foundation. The guys are made separately detachable from the anchors. They are also provided with turnbuckles whereby they can be strained.

63 denotes a collar rotatably supported upon a collar 63', fixed to the supporting-pipe. It is provided with lugs 64 and a bolt 64' to receive hooks or loops 27', or the guys or hooks 65 may be provided to receive the loops or hooks 27' to hold the guys. The guy hooks or loops have a free play on and about the bolts or hooks on the collar, and the latter is free to move circumferentially.

66 denotes an open clamping-ring fastened to a post 67 by a bolt passing through the lugs 68 of the ring and adapted to receive a hook or loop 27" of a guy. The construction is such that the hook or loop may move freely about the bolt and have play between the lugs, and the construction provides both for the swaying of the tower and for the application of the guys.

The guys are flexible and are used to stay the pipe 15 laterally, which they do in a yielding manner, unlike the effect of a rigid frame. It is desirable that the structure yield laterally to some extent before strong blasts of wind. The effect of the wind on the mill-support is reduced by the substitution of the comparatively small pipe in place of a heavy frame, such as heretofore used, and to still further guard against damage by wind the flexible stays, loosely connected in substantially the manner specified, are employed, from which it results that the windmill will be swayed by strong blasts without being overthrown or broken, as often happens to stouter and more expensive mill-supports. The securing of the foot of the stays independently of the power-transmitting-rod platform contributes to the described results.

A swaying movement of the mill within moderate limits without bringing the transmission-rod into contact with the supporting-pipe is provided for by a fender or fenders 69. Obviously such swaying of the mill or a bending of the supporting-pipe would be liable to cause an injurious degree of friction in the case of a vertically-reciprocated power-transmitting rod situated within the pipe. In the construction herein described such bending will not occasion any considerable degree of friction, and especially since a rotating power-rod combined with fenders is employed.

The flexible character of the stays and their loose connections with the pipe contribute to the security of the structure by permitting the moderate degree of swaying or torsion under the influence of blasts sufficient to destroy rigid frames, though much heavier.

The guys are preferably made of wire, wire rope, or the like; but tubes or rods having flexible joints intermediate their points of attachment are not excluded. Such lateral stays for the pipe 15 are used in combination with the foot-supports or tripod in lieu of the heavy and expensive towers or frames heretofore most commonly used. The original cost of the supporting-pipe and guys is comparatively small, and as constructed and arranged in the present improvement repairs are more easily and cheaply effected, since it employs no large frame liable to strain, wear, and rust and requiring that the whole tower be taken down for the renewal of any material part. There is no working and wearing of joints in guys as in frames having studs or posts, and there is less liability to rust. Should, however, renewal of any part be required, substitution can be made without taking down the mill. Such renewal is facilitated both by the nature of the attachment of the guys to the pipe and to the anchors and also by the accessibility of the guys both at top and bottom, and more particularly by the independence of the attachments of the guys both to the pipe and to the anchors.

28 denotes a bevel-gear fixed to rod 3, and 29 a gear meshing therewith and fixed to the hollow wind-wheel shaft 30, having a flaring or trumpet-shaped mouth 30' and a closing-nut 30". This hollow shaft has a bearing in the head 18, as shown in Fig. 1.

The improvement is not limited to the trumpet-shaped mouth for the wind-wheel shaft, and other forms may be substituted in many cases, and particularly in large-sized mills. In Fig. 1$^b$ curved guides or half-pipes 30$^x$, one for each cord, are indicated. These offer less resistance to the wind than an entire flared or trumpet-shaped mouth.

31 denotes a swiveling piece carried on the end of an adjusting-screw 31", to which piece is fixed a spring 32.

31' is a cap closing the interior shaft 30. The screw works through this cap. The tension of the spring can be adjusted by the screw, which moves the piece or plug 31. The spring is also attached to a plug 33, movable endwise the tubular shaft, to which plug are fixed wire or other ropes 33'. These at their outer ends are attached to the rods 34, which latter are rigidly fixed at 37 (see Fig. 3) to the wind-wheel sections 35, said rods being pivoted to and between the arms or spokes 36 and adapted to be turned by the centrifugal action of the weights. The sections 35 comprise a plurality of fans 35', fixed to the shaft or pivoted rod 37'. Said fans are thrown more or less out of the wind by the rotation of the section-rods caused by the centrifugal action of the weights when the velocity of the wheel is greater than desired.

As shown in Fig. 1, the spring 32 has drawn inwardly the counterweight-rods 34 and thereby thrown the sections 35 into the face of the wind.

The weighted rods operate by their centrifugal action to throw the sections more or less out of the wind when the speed of the rotation of the wheel exceeds that predetermined by the adjustment of the spring 32, which spring tends to normally hold the sections full in the wind, said spring and weighted rods acting in opposition to each other.

Referring to Figs. 12 and 13, 38 denotes a coiled spring secured in a grooved ring or flange 39, fixed on the wind-wheel shaft. 40 (see Fig. 13) denotes a pin for holding the ring-coil in a suitable groove or seat in the exterior part 39. Upon the rudder is a bar or piece 41, (see Fig. 2,) adapted to be moved between the coils of the spring 38 to act as a brake. This occurs when the wheel is thrown out of the wind and the rudder moved to a plane parallel therewith, carrying the bar 41 or the like into operative contact with the spring. The form of the spring is not essential, and if an annulus of coiled wire, such as shown, is used the particular form of the device for supporting it may be varied.

In Figs. 10 and 11 the wire coil is shown secured in the perforated rim 39' of a wheel adapted to be fixed on the wind-wheel shaft. While a coiled spring is preferred, yet other forms are not excluded, and any which are adapted to obstruct the rotation of the wheel and gradually bring it to rest and then serve as a positive stop by engagement of the spring with a part fixed to the rudder is within the improvement.

An important feature of the invention is the construction whereby the power-transmitting rod can be simultaneously used to throw the gears out of mesh and immediately move the wheel and rudder out of the wind and brake the wheel.

As shown in Fig. 2, the position of parts is that which they assume when the gears 28 and 29 have been disengaged by the dropping of the connecting-rod 3. Said rod falls by gravity when relieved by screwing down sleeve 11. It can, if necessary, be forced down by screwing down the sleeve 11 against the lower set-ring, as before explained. Further, as shown in said figure, the wind-wheel and rudder are parallel and are in position to present their edges to the wind and the brake is in operation.

Devices for moving the rudder from the position indicated in Fig. 1 to that represented in Figs. 2 and 3 are shown in the latter figures.

42 denotes a bar, conveniently made of curved form, which supports the rudder by means of a sleeve or ring 43 at its upper end embracing a tubular extension 44 of the head or frame 18. Said extension also guides and supports laterally the power-transmitting rod.

The foot of the rudder-supporting bar has a pin or part 45 engaged in a spiral recess or slot 46 in the wall of the guide-pipe 17. The rudder by means of said connections normally assumes the situation represented in Fig. 1 through the influence of gravity. It is raised and turned to the situation indicated elsewhere by the action of the rod 3 when lowered. The gear 28 of the rod at such time pressing down a lever 47 pulls upon a cord or rope 48 and elevates the rudder-supporting bar by means of the pulley 49. The pulley 49 may have a swiveling support of any convenient or desired kind, whereby it can follow the rudder horizontally, and thus prevent the rope 48 from being pulled over or across its rim.

In Fig. $16^x$ are shown modified devices for moving the wind-wheel sections into or out of the wind. 50 denotes a weighted lever having a fulcrum in the windmill-head. One end of said lever is connected by a cord 50' to a bent lever 52, and also to a lever 53. The latter is situated in the path of the gear 28 on the rod 3, and when said rod is lowered said lever is forced down with the effect to turn the bent lever 52 and move the rings 55 and 56 by means of a rod 57, connecting said bent lever to the outer ring 56. The latter moves freely in a circumferential groove of the ring 55, and the latter ring slides freely on the wind-wheel shaft $30^x$. (Represented as solid in the present instance.) The ring 55 is connected to and turns with the wind-wheel and, as shown in said figure, they are in position corresponding to full exposure of the wind-wheel sections to the wind.

In Figs. 14 and 15 another modification of devices for adjusting the rudder by means of the power-transmitting rod is indicated. The rudder is loosely connected to the pipe 15 by a sleeve 57'. A curved slot in the pipe 15 is denoted by 59, and 60 is a part or pin traveling in said slot. The rudder is normally kept by gravity in an operative position by its weight, the pin 60 being at such time at the bottom of the slot, as indicated in the first-described construction. The rudder is raised and the wind-wheel brought into an inoperative situation upon lowering the rod 3 by the gear 28 pushing down the lever 61 and raising and turning the rudder by means of the cord 62, the turning being effected by the slot, as before.

In Fig. 16 are shown modified devices for moving out a wind-wheel of common form by the same movement of the transmitting-rod that disconnects the driving-gears. 63 denotes a bell-crank lever having a fulcrum at 64 and loosely connected to a sliding ring 65, having a pin 66, engaging a slot 67 in an arm of said lever. 68 denotes the hub of a wind-wheel, and 69 connections between the ring 65 and the blades or wind-receiving parts of the wheel, whereby said parts are moved out of the wind. 70 denotes a weighted returning-lever connected by cord 71 with lever 63.

In Fig. 17 are illustrated modified devices for moving a rudder by the movement of the transmitting-rod that disconnects the driving-gears. 72 indicates a rudder loosely supported on pipe 15 by a sleeve 72'. 73 is a lever, which preferably is split, as at 73', to embrace the transmitting-rod. 74 is its fulcrum, and 75 is a returning-spring. When the rod, with gear 28, is lowered, it bears down the lever and pulls the rudder around by the chain 75', which may pass over a pulley supported in a bracket 76, fixed to the guide-tube 15.

It is deemed important that the wind-wheel and its supporting-tube be upheld by a short support at the foot of said tube, comprising a tripod or the like and preferably a small platform, and by stays which are flexible and loosely connected to the pipe and have attachments to the ground or elsewhere independent of the tube foot-support, the objects of the combination being to avoid frames involving the use of large beams inserted in the ground or attached to a roof or the like, to avoid the rigidity of frames composed of inflexible stiffly-connected bars or beams, and to avoid the necessity of taking down the mill for the repair of its lateral supports, and it may be noted that the situation of the guy posts or anchors can be varied and new ones planted beside others, which it may be desirable to replace, and the guys can be disconnected from the old posts or anchors and connected to the new without disturbing their upper connections, which are freely movable both in vertical and horizontal planes.

The uses of the power-transmitting rod to adjust the wind-wheel and the fan and to brake the former are important results of the improvement and also the accessibility of the interior of the upper end of the supporting and guide pipes without removing the wind-wheel or its supporting-head. Further, the platform rotatable horizontally with the wind-wheel head or frame is practically important for the convenience and safety of persons having to work at the top of the mill, and its value is enhanced by a movable section and an open structure. The novel devices for supporting the power-transmitting rod and moving it vertically are distinguished by their simplicity, convenience of manipulation, and certainty of action.

The device for automatically adjusting the wind-wheel to a desired velocity within practical limits is marked by its great economy, simplicity, and efficiency, and the use of a hollow wind-wheel shaft is believed to be new.

Many details, however, may be varied without departure from the invention, and different parts of the improvement may be used without the others. It is not necessary that the hollow wind-wheel shaft be closed by a nut or cap, nor that the coil-spring of the wind-wheel shaft be connected to the ropes by a plug; and the invention includes any or all mechanical changes which do not introduce substantially different mechanical principles, operations, and constructions.

Having described my invention, I claim—

1. The combination of a wind-wheel, means for supporting it in operative position, the power-transmitting rod, gears intermediate the wheel and rod, a base, the rod-supporting ring mediately supported on the base, a hand-wheel surrounding the ring and provided with a recess below said ring, antifriction devices situated in said recess, and devices connecting the base and hand-wheel whereby the latter can be used to raise and lower the rod, ring and antifriction devices with respect to the base, substantially as described.

2. The combination of a wind-wheel, means for supporting it in operative position, the power-transmitting rod, gears intermediate the wheel and rod, a base, the rod-supporting ring, a hand-wheel, and the screw-threaded sleeve, said wheel engaging the sleeve and the latter engaging the base, substantially as described.

3. The combination of a wind-wheel, means for supporting it in operative position, the power-transmitting rod, gears intermediate the wheel and rod, a base, the rod-supporting ring, a hand-wheel, the screw-threaded sleeve, said wheel engaging the sleeve and the latter engaging the base, and a jam-nut engaging the said sleeve adjacent the base, substantially as described.

4. The combination of a wind-wheel, means for supporting it in operative position, the power-transmitting rod, gears intermediate the wheel and rod, a base, the rod-supporting ring, a hand-wheel, the screw-threaded sleeve, said wheel engaging the sleeve and the latter engaging the base, and a ring or like stop fixed on the rod near the foot of the sleeve whereby the latter may be used to force down the rod, substantially as described.

5. In a windmill the power-transmitting rod, means for supporting said rod situated near the foot of the tower, the wheel-supporting pipe surrounding the rod, a rotatable fender between the rod and pipe, and flexible guys having their upper ends attached to a ring freely movable about the pipe, a clamping-ring to support vertically said first-named ring at its upper part, said guys, and suitable fastenings for the other ends of the guys, substantially as described.

6. In a windmill the power-transmitting rod, means for supporting said rod situated near the foot of the tower, the wheel-supporting pipe surrounding the rod, a rotatable fender between the rod and pipe, and flexible guys having their upper ends attached to a ring freely movable about the pipe, a clamping-ring to support vertically said first-named ring at its upper part, said guys, and suitable fastenings for the other ends of the guys comprising a post and a movable ring to which the guys are fixed, substantially as described.

7. In combination with the wind-wheel support comprising a supporting-pipe, the frame or head having a tubular guide fitting said pipe, and a platform fixed to the guide and rotatable with it and with the frame, substantially as described.

8. In combination with the wind-wheel support comprising a supporting-pipe, the frame or head having a tubular guide fitting said pipe, and a platform fixed to the guide and rotatable with it and with the frame, said platform having a movable section, substantially as described.

9. In a windmill, the rotating head carrying the wind-wheel, a platform mediately fixed to and rotatable with the head and wheel about a wheel and head support, and said support, substantially as described.

10. The combination of the wind-wheel-supporting pipe, the head or frame, a rudder supported on said frame, a power-transmitting rod, gears intermediate the rod and wind-wheel, said gears being adapted to be disconnected by lowering the rod and mechanism intermediate the rod and rudder whereby the latter is turned parallel to the wheel to throw it edgewise of the wind when said gears are disconnected, substantially as described.

11. The combination of the wind-wheel-supporting pipe, the head or frame, a rudder supported on said frame, a power-transmitting rod, gears intermediate the rod and wind-wheel, said gears being adapted to be disconnected by lowering the rod and mechanism intermediate the rod and rudder whereby the latter is turned parallel to the wheel to throw it edgewise of the wind when said gears are disconnected, and a wind-wheel brake adapted to be put in operation by said movement of the rudder, substantially as described.

12. The combination of the wind-wheel-supporting pipe, the head or frame, a rudder supported on said frame, a power-transmitting rod, gears intermediate the rod and wind-wheel, said gears being adapted to be disconnected by lowering the rod and mechanism intermediate the rod and rudder whereby the latter is turned parallel to the wheel to throw it edgewise of the wind when said gears are disconnected, and a wind-wheel brake adapted to be put in operation by said movement of the rudder, said brake comprising a part fixed to the rudder to engage a spring or springs mediately connected to the wheel, substantially as described.

13. The combination of a wind-wheel shaft, spokes 36 fixed to the shaft, fan-sections comprising rods 37' each pivoted between spokes and immediately opposite the pivot-bearing of others, counterweight-levers fixed to the section-rods intermediate their ends, a spring supported by the shaft, and flexible connections between the spring and the weighted levers, substantially as described.

14. In a wind-wheel, the combination of a shaft, a spring, fans suitably supported from the shaft, counterweighted rods connected to the fans and a flexible connection directly joining each rod and the spring, substantially as described.

15. In a wind-wheel, the combination of a shaft, a spring, fans suitably supported from the shaft, counterweighted rods connected to the fans, a flexible connection directly joining each rod and the spring, and means to regulate the tension of the spring, substantially as described.

16. In a wind-wheel, the combination of a hollow shaft, a spring situated interiorly of the shaft, fans suitably supported from the shaft, counterweighted rods connected to the fans and a flexible connection directly joining each rod and the spring, substantially as described.

17. The combination of the wind-wheel and supporting-pipe, the head or frame supported by said pipe, the hollow plug 19 secured to the head and mediately bearing upon the supporting-pipe to support the head thereon, the power-transmitting rod passing through the plug, and means for temporarily supporting the head on the pipe independently of said plug, a removable screw or the like to prevent the turning of the plug, and means whereby the plug can be independently removed, substantially as described.

18. In a windmill the combination of a wind-wheel a power-transmitting rod, gears intermediate the rod and wheel, said gears being separable by moving the rod, a rudder, and devices intermediate the rudder and rod whereby when the gears are separated the rudder is turned, substantially as described.

19. In a windmill, the combination of the wind-wheel having adjustable fan-sections to receive the force of the wind, a hollow wind-wheel shaft closed at its inner end by a cap or plug, a regulating-spring situated in the shaft and connected to said adjustable fan-sections, a connection between the spring and said sections, and a screw passing through the shaft-cap and bearing on the spring to adjust its tension, substantially as described.

20. In a windmill the combination of the wind-wheel having adjustable fans, the hollow trumpet-mouthed wheel-shaft, the endwise-movable plug situated in the shaft, flexible connections between the plug and the fans, a spring to hold the plug in the shaft and a spring tension device adapted to hold the spring to the shaft, substantially as described.

21. In a windmill, a coiled spring connected to the wind-wheel shaft in combination with a braking-piece adapted to bear on the spring-coils successively and then rest between two coils to gradually arrest the wheel and then positively hold the same, substantially as described.

22. In a windmill the combination of a wind-wheel a power-transmitting rod, gears intermediate the rod and wheel, said gears being separable by moving the rod, a rudder, and devices intermediate the rudder and rod whereby when the gears are separated the rudder is turned, substantially as described.

In testimony whereof I have signed this specification in the presence of two subscribing witnesses.

HERMAN SOELLNER.

Witnesses:
 JOS. H. BLACKWOOD,
 BENJ. R. CATLIN.